Nov. 13, 1928.
J. M. WOLF
1,691,865
HAY BALING DEVICE
Filed Feb. 4, 1928
5 Sheets-Sheet 5
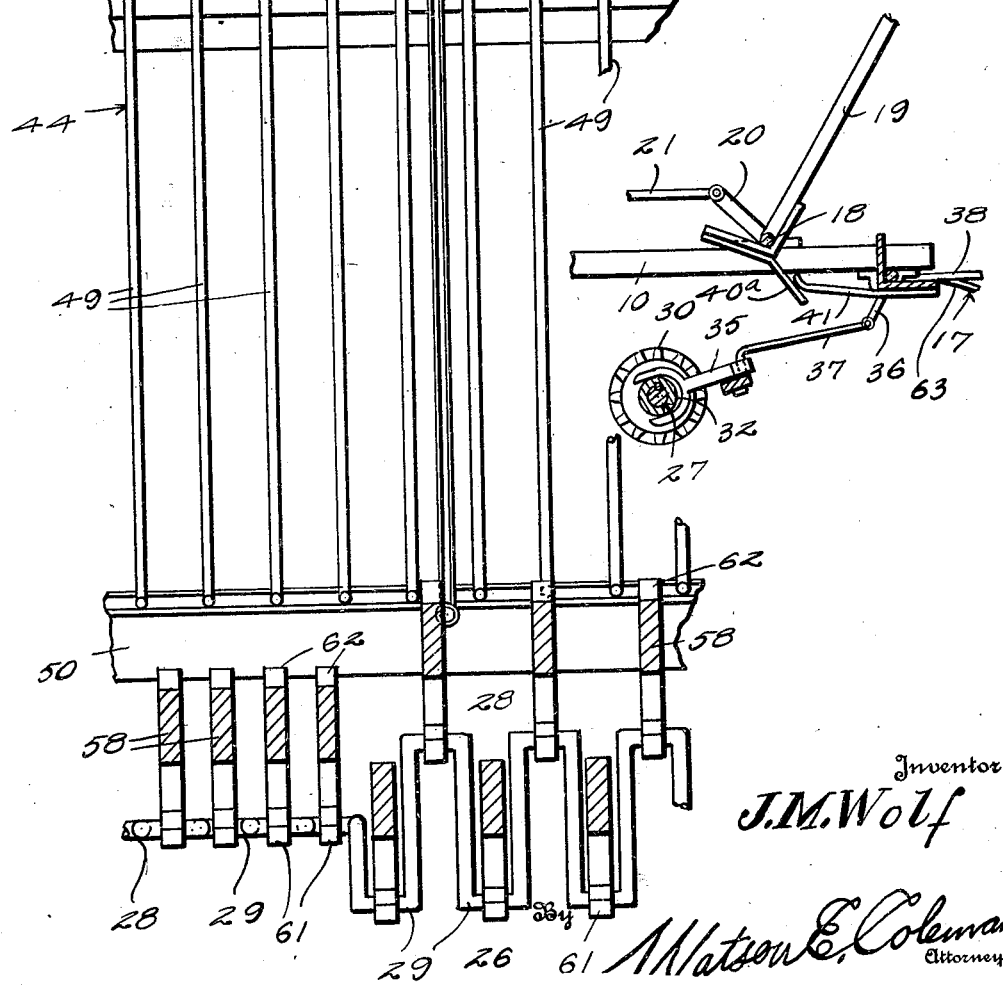
Inventor
J. M. Wolf
By Watson E. Coleman
Attorney Patented Nov. 13, 1928.

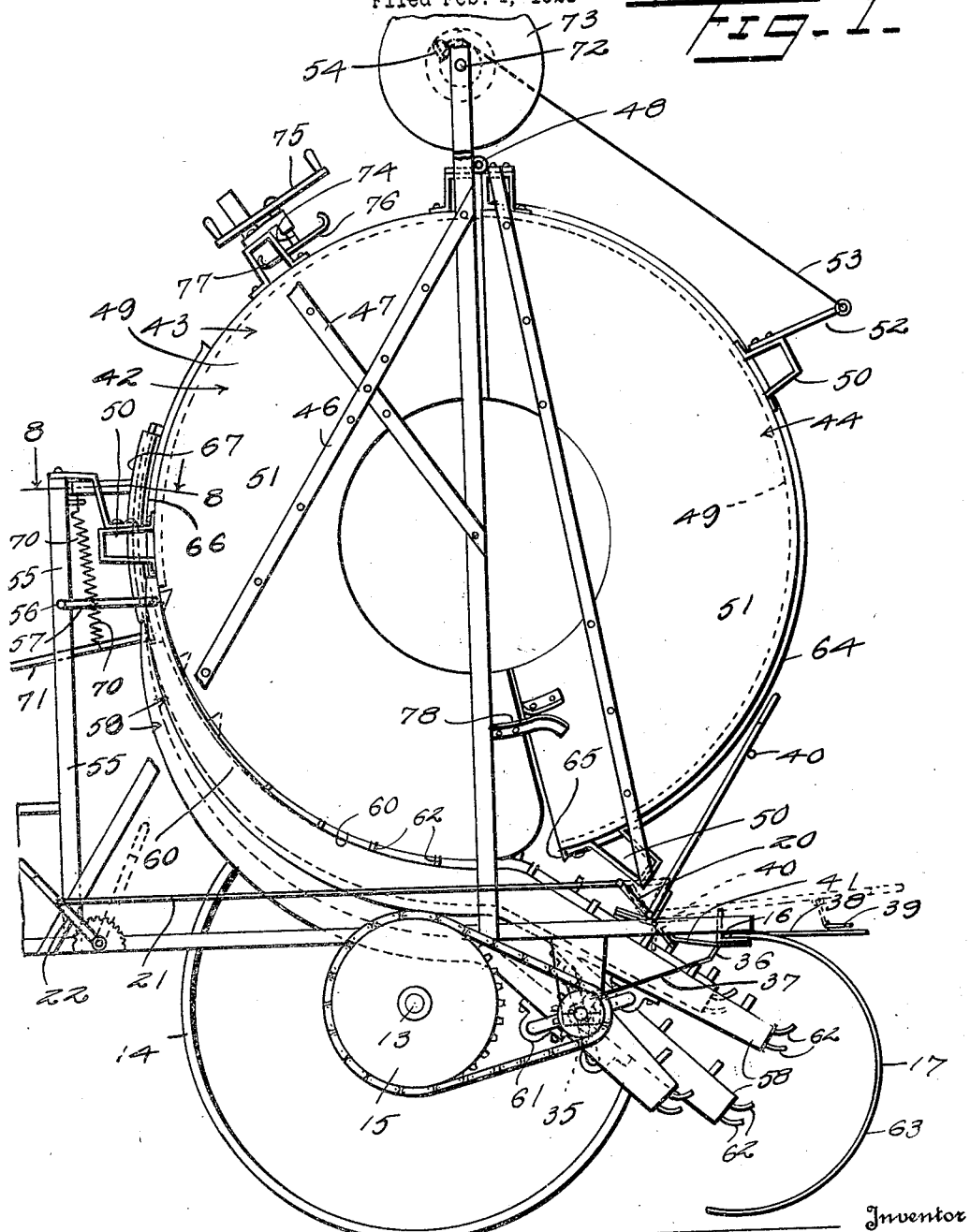

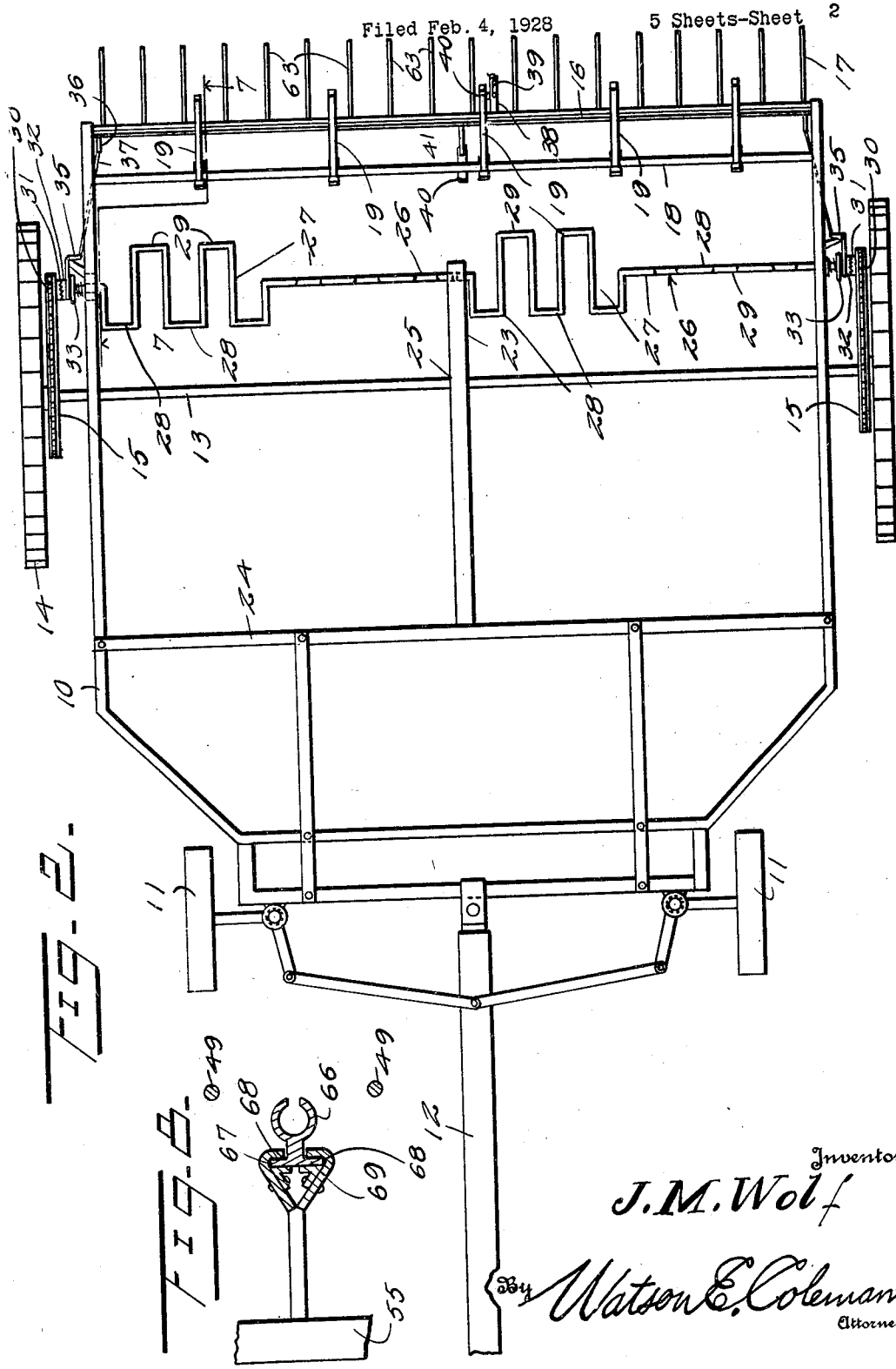

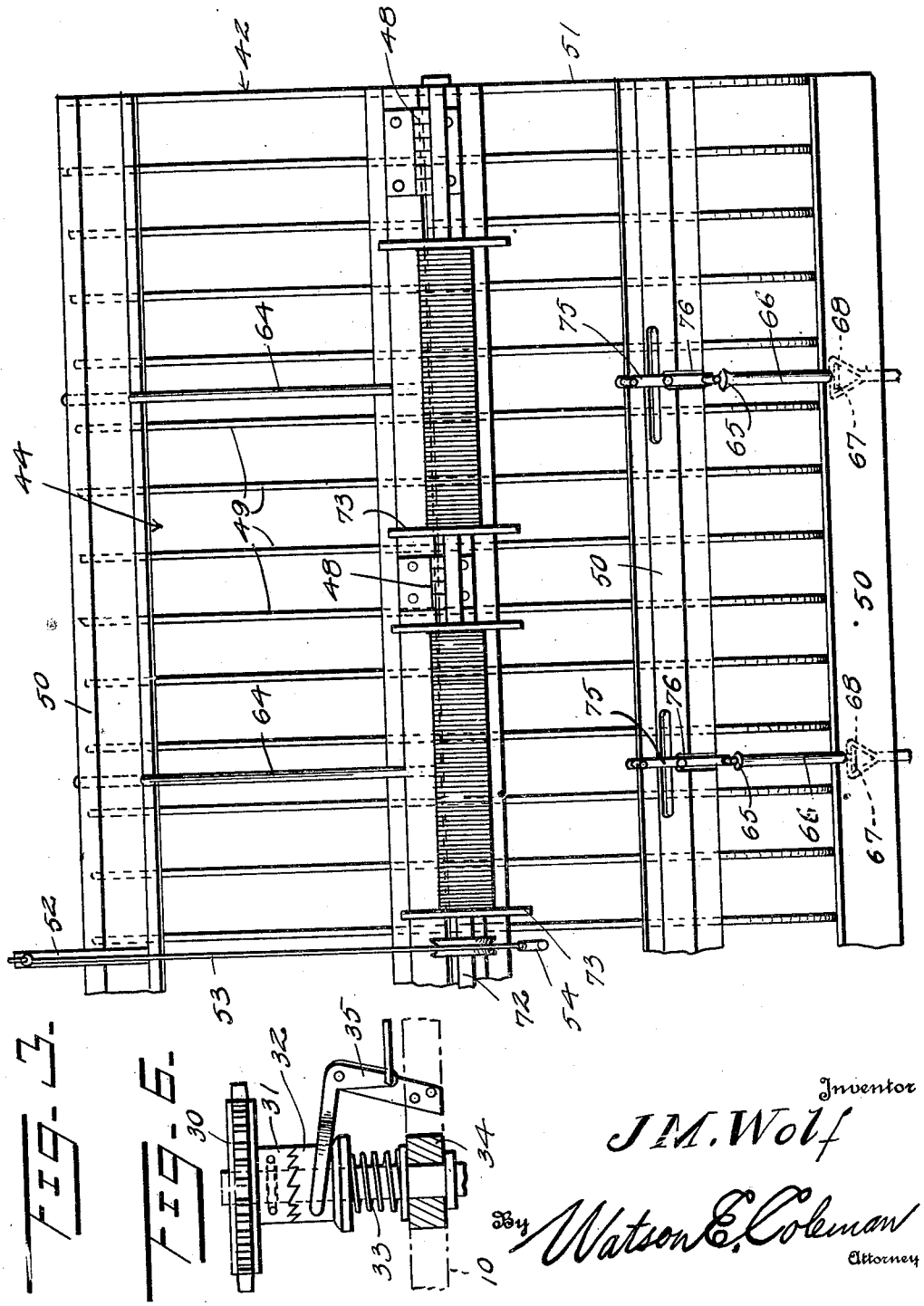

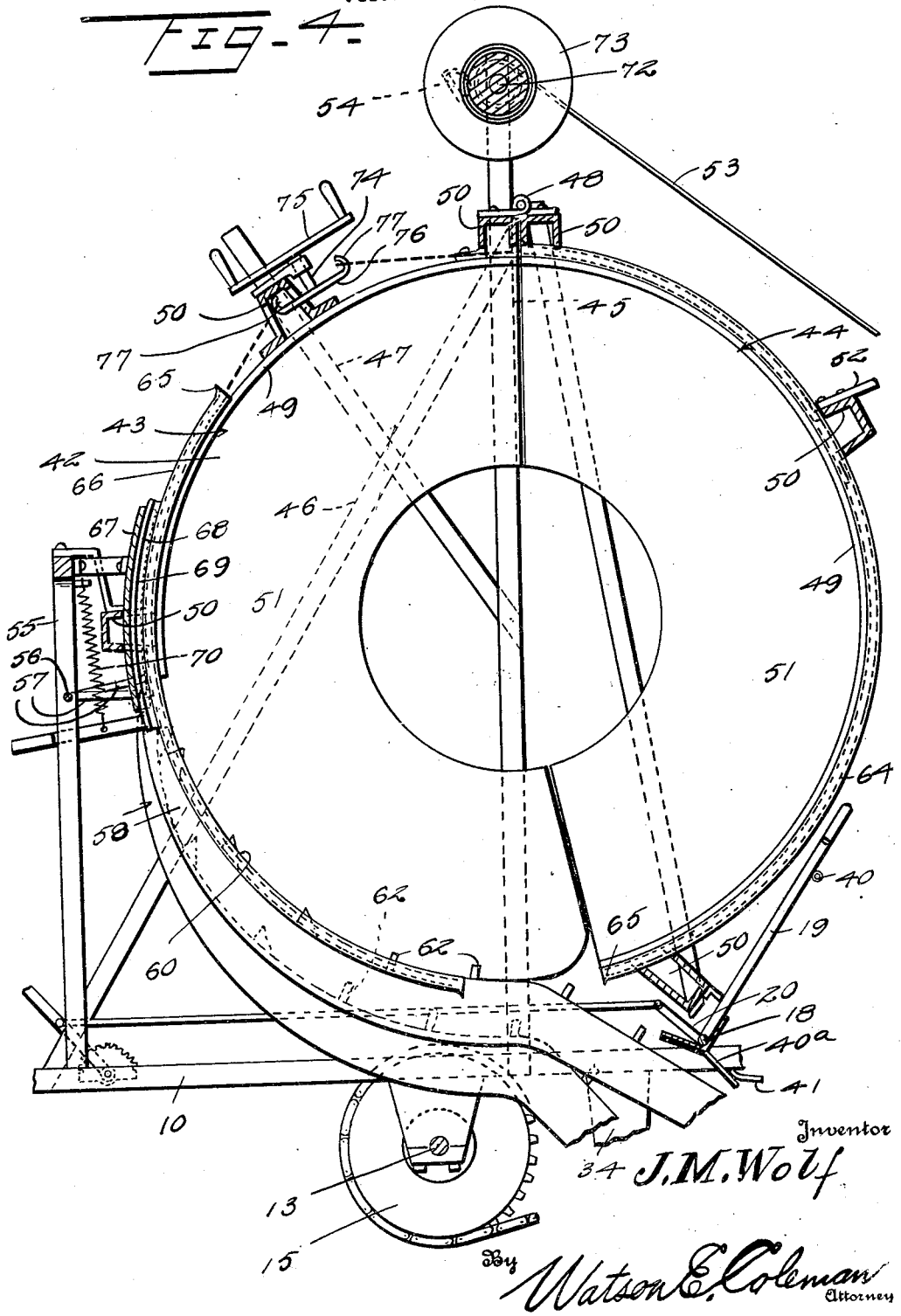

1,691,865

UNITED STATES PATENT OFFICE.

JOHN M. WOLF, OF DEVILS LAKE, NORTH DAKOTA.

HAY-BALING DEVICE.

Application filed February 4, 1928. Serial No. 251,957.

This invention relates to a hay baling device and more particularly to a device adapted to be moved over a hay field to gather the hay and form it into loose bales which may be conveniently stored in a barn or the like.

An important object of the invention is to produce a device of this character, of such construction that operation over the field gathers the hay and forces the same into a container, by means of which it is shaped into a bale, the container being of such character that the formed bale may be discharged when completed.

A further object of the invention is the production of a construction such that tie wires may be readily placed about the completed bale.

A still further object of the invention is the provision of novel and improved means for directing and packing the hay into the container.

These and other objects I attain by the construction shown in the accompanying drawings, wherein for the purpose of illustration is shown a preferred embodiment of my invention and wherein:—

Figure 1 is a side elevation of a hay gathering and baling device constructed in accordance with my invention;

Figure 2 is a plan view of the chassis or frame thereof;

Figure 3 is a plan view of the bale forming casing;

Figure 4 is a longitudinal sectional view through the apparatus;

Figure 5 is a fragmentary transverse sectional view therethrough;

Figure 6 is a detail view showing the clutch controlling operation of the packing arms;

Figure 7 is a detail view showing the connections of the clutch with the remaining mechanism;

Figure 8 is a section on the line 8—8 of Figure 1.

Referring now more particularly to the drawings, the numeral 10 generally designates a frame supported at its forward end by steering wheels 11 preferably controlled by a draft bar 12. At its center, the frame has secured thereto a transversely extending axle 13 upon which are mounted supporting drive wheels 14 having secured thereto sprockets 15. At its rear end, the frame is provided with a transversely extending shaft 16 upon which is rotatably mounted a hay rake 17. Forwardly of the shaft 16, the frame supports a transversely extending rock shaft 18 having a plurality of arms 19 extending in the same general direction thereof and spaced transversely of the frame. A further arm 20 is adapted for connection through a link 21 of a control lever 22 mounted upon the frame adjacent the forward end thereof.

Mounted in a support 23 secured at its forward end to a cross member 24 of the frame and adjacent its rear end to the axle 25 are the inner ends of a pair of aligned crank shafts 26. Each crank shaft 26 includes two groups of cranks 27, which are displaced through 180° with relation to one another and each includes cranks 28 and 29 arranged alternately and displaced through 180° with relation to one another. The outer ends of the crank shafts have splined thereto sprockets 30 aligning with the sprockets 15 of the respective wheels 14, these sprockets 30 having their inner faces formed as clutch jaws 31. Slidable upon and held against rotation with relation to the crank shafts are complementary clutch jaws 32, which are urged into engagement with the clutch jaws 31 by springs 33. A bearing bracket for the shaft, indicated at 34, likewise supports a pivoted lever 35, by means of which the clutch element 32 may be disengaged from the clutch element 31.

The rake element 17 has secured thereto an arm 36, which is connected through a link 37 with the clutch element 35. It likewise has a further rearwardly directed arm 38, which has pivoted thereto a catch element 39. This catch element is adapted for coaction with a catch element 40 carried by one of the arms 19 of the rock shaft 18, and is engageable therewith when this rock shaft is in its rearmost position, indicated in dotted lines in Figure 1. It will be obvious that by engaging these latch elements and then shifting the control lever 22 to move the shaft 18 and its arms to the solid line position, the rake will be elevated or moved to inoperative position. By this movement through the arm 36, link 37 and lever 35, the sections of the clutches are disengaged and rotation of the crank shafts checked. The rock shaft 18 has secured thereto a bracket 40ª, which, in the elevated position of the arms 19, engages against spring means 41 secured to the rake element 17 to apply a spring tension, maintaining this rake element in its proper operative position.

The numeral 42 generally designates a drum formed in two sections 43 and 44. The section 44 is supported from the frame by braces 45, 46 and 47 carried by the frame, while the section 44 is pivoted to the section 43 along the upper edge thereof, as indicated at 48. The section 43 is substantially semi-circular in form, while the section 44 is somewhat less than a semi-circular segment. Each section has an outer wall consisting of arcuately curved circumferentially extending rods or tubes 49 secured to one another by longitudinally extending angle iron elements 50 and end walls 51 in the form of solid flanges extending inwardly from the ends of the outer walls. One of the brackets 50 of the section 44 has attached thereto an arm 52, to the outer end of which is secured a cable 53 having a pull handle 54, by means of which the section may be swung to the open position. The arms 19 of the rock shaft 18, when in raised position, coact with a second bracket 50 to prevent rearward movement of the lower end of the section 44 and thus serve to hold the drum in its closed position. The construction of the sections provides at the lower end of the drum a transversely extending mouth when the sections are in the closed position.

The numeral 55 designates a pair of standards extending upwardly from opposite sides of the frame and connected by a shaft 56. Pivoted to this shaft are arms 57, the inner ends of which are pivotally connected to the upper ends of packers 58. Each packer 58 is in the form of a bar, the upper end of which is arcuately curved to approximate the contour of the periphery of the drum, as indicated at 60, and the lower end of which is substantially straight. The upper surface of each arm is provided with teeth and each arm adjacent its lower end has a bearing 61 for the reception of a crank shaft. The lower ends of the packers are likewise provided with teeth, as indicated at 62, and these ends, because of the connection with the crank shafts, travel upon a substantially circular path which, at one point, approaches the teeth 63 of the rake element. At this time, the lower ends of the packers are moving first upwardly and then forwardly, with the result that hay engaged thereby is advanced toward the mouth of the drum. As alternate arms are operating in opposite cycles as each arm recedes from the hay, a second arm engages the same to continue advance. The upper ends of the packers 59, because of their connections at 57, move substantially vertically and serve to advance the incoming hay upon the interior periphery of the drum. The hay, therefore, moves within a circular path within the drum and is spirally rolled until the drum is filled and the contents thereof thoroughly packed, at which time it may be tied and released by shifting the movable drum section 44 to permit the same to be discharged. Before shifting the movable drum section, it is necessary that the lever 22 be operated to move the arms 11 to their inoperative position. These arms 11 then act as a discharge bumper against which the released bale engages and deflect the released bale rearwardly, so that it will not contact with the rake element in such fashion as to cause damage thereto.

The bales are preferably tied by applying binding wires thereto. As a means for accomplishing this function, I provide the drum section 44 with three or more longitudinally spaced circumferentially extending tubes 64 secured upon the periphery thereof and having their inner walls provided with a longitudinally extending slot. The lower ends of the tubes 64 are flared, as indicated at 65. Upon the stationary drum section 43, I mount a similar series of tubes 66, these tubes having mountings permitting the same to be shifted circumferentially with relation to the section 43. In the present instance, brackets 67 are provided having opposed guide slots 68 in which the edges of flat arcuate plates 69 secured to the tubes 66 extend. The tubes 66 are likewise provided at their inner faces with longitudinally extending slots. These tubes are connected with springs 70, which constantly tend to hold the same in a retracted position. A foot treadle 71 is secured to each tube 66, so that the same may be depressed to cause the same to shift circumferentially of the section 43 and engage its lower end in the flared mouth 65 of the coacting tube 64. The drum supporting standards preferably likewise provide the support for a shaft 72 extending transversely of the machine above the drum. This shaft has mounted thereon three wire spools 73, the wire from which may be directed through the associated tubes 64 and 66.

One of the brackets 50 of the section 43 provides a mounting for a plurality of wire twisters, each preferably comprising a rotatable shaft 74 having at one end an operating handle 75, whereby it may be rotated and at its opposite end a transversely extending sweep 76. The ends of this sweep have means, generally designated at 77, for engaging the ends of the wire to secure the same thereto. A wire passed through the tubes, the ends of which are engaged with these means, may be twisted to tighten the same upon the bale.

In the use of the device, it is driven over the field and hay gathered by the rake and piling in front of the same is engaged by the teeth at the lower ends of the packers and advanced into the drum and moved circumferentially thereof, as hereinbefore described.

When the drum is completely filled and the hay therein sufficiently packed, longitudinal movement of the machine is checked and the operator successively shifts the tubes 66 until they engage with the tubes 64, passes wires therethrough and twists the ends of these wires until they are firmly clamped upon the bale. The bale is then discharged by pulling upon the hand grip 54 to swing the section 44 to the open position, the lever 22 having previously been released to permit this operation. In the discharge of the bale, the arms 19 act as a surface over which the bale may move to prevent damaging engagement with the rake. After the bale is discharged, the pull handle 54 is released, permitting the section 44 to swing to its closed position by gravity and the lever 22 operated to latch the section 44 in its closed position, when the device is ready for a repetition of the above described operation. It will be understood that during the operation of placing each tying wire about the bale, the operator keeps his foot upon the treadle 71, controlling the tube 66 which is being employed, and upon completion of this operation and the release of the treadle, this tube 66 returns to its normal position. When it is desired to transport the machine from place to place, the lever 22 is moved rearwardly and the coacting catch elements of the rake and arms 19 engaged with one another. The lever 22 is then moved forwardly, with the result that the rake 63 is swung upwardly. As previously described, this operation disconnects the clutch elements 32 from the clutch elements 31, so that the crank shafts become inoperative, while the rake is so positioned that it will not be in danger of contact with the surface of the road which might damage the same. In order to assure proper alignment of the tubes, guides 78 are preferably provided with which the lower end of the movable section engages when in closed position.

By employing the apparatus hereinbefore described, a loosely formed hay bale is provided, which is circular, so that when the bales are stacked, air spaces will be provided therebetween, permitting circulation of air, so that the hay will be more rapidly dried. The hay being loose in the bales assists further in the rapid drying, and at the same time, the hay is conveniently bundled for transportation or storage.

Since the construction hereinbefore set forth is capable of a certain range of change and modification without materially departing from the spirit of the invention, I do not limit myself to such specific structure except as hereinafter claimed.

I claim:—

1. In a hay gathering and baling apparatus, a wheel supported platform, a rake supported thereby, a horizontally disposed transversely extending bale forming drum supported by the platform and embodying a section movable to permit discharge of a bale formed therein and means operating during movement of the machine conveying hay from the rake to the interior of the drum and causing the same to move perimetrically of the drum.

2. In a hay gathering and baling apparatus, a wheel supported platform, a rake supported thereby, a horizontally disposed transversely extending bale forming drum supported by the platform and embodying a section movable to permit discharge of a bale formed therein, means operating during movement of the machine conveying hay from the rake to the interior of the drum and causing the same to move perimetrically of the drum, and means for directing a bale tie about a bale formed in the drum while contained within the drum.

3. In a hay gathering and baling apparatus, a wheel supported platform, a rake supported thereby, a horizontally disposed bale forming drum supported by the platform and horizontally longitudinally split into two sections one of which is movable to permit discharge of a bale formed in the drum, said sections when in closed position having adjacent edges thereof at the lower ends spaced to form a mouth and means operating during movement of the machine conveying hay from the rake through said mouth to the interior of the drum and causing the same to move perimetrically of the drum.

4. In a hay gathering and baling apparatus, a wheel supported platform, a rake supported thereby, a horizontally disposed bale forming drum supported by the platform and horizontally longitudinally split into two sections one of which is movable to permit discharge of a bale formed in the drum, said sections when in closed position having adjacent edges thereof at the lower ends spaced to form a mouth, means operating during movement of the machine conveying hay from the rake through said mouth to the interior of the drum and causing the same to move perimetrically of the drum, and means for directing a bale tie about a bale formed in the drum while contained in the drum.

5. In a hay gathering and baling apparatus, a wheel supported platform, a rake supported thereby, a horizontally disposed bale forming drum supported by the platform and horizontally longitudinally split into two sections one of which is movable to permit discharge of a bale formed in the drum, said sections when in closed position having adjacent edges thereof at the lower ends spaced to form a mouth and means operating during movement of the machine conveying hay from the rake through said mouth to the interior of the drum and causing the same to move perimetrically of the drum, circumferentially extending tubes secured to the movable section of the drum and held against movement with relation thereto, longitudinally movable circumferentially extending tubes secured to the other section of the drum and movable to engage with the end of a corresponding tube of the movable section, said tubes each having its inner wall slotted and in communication with the interior of the drum whereby a wire may be introduced therethrough to encompass a bale formed within the drum while contained therein.

6. In a hay gathering and baling apparatus, a wheel supported platform, a rake pivotally supported thereby, a horizontally disposed bale forming drum supported by the platform, said drum being longitudinally vertically split, the sections of the drum being pivoted to one another along their upper edges and having their lower edges spaced when in closed position, conveyor mechanisms for delivering hay from the rake to the interior of the drum operable during movement of the platform over the ground and including clutches whereby they may be rendered inoperative, one of said sections being stationary, means for shifting the rake to inoperative position and means operated by the shifting of the rake to inoperative position, disengaging said clutches.

7. In a hay gathering and baling apparatus, a wheel supported platform, a rake pivotally supported thereby, a horizontally disposed bale forming drum supported by the platform, said drum being longitudinally vertically split, the sections of the drum being pivoted to one another along their upper edges and having their lower edges spaced when in closed position, a conveyor mechanism for delivering hay from the rake to the interior of the drum operable during movement of the platform over the ground and including clutches whereby they may be rendered inoperative, one of said sections being stationary, means for shifting the rake to inoperative position, and means operated by the shifting of the rake to inoperative position disengaging said clutches and locking the movable section in closed position.

8. In a hay gathering and baling apparatus, a wheel supported platform, a rake pivotally supported thereby, a horizontally disposed bale forming drum supported by the platform, said drum being longitudinally vertically split, the sections of the drum being pivoted to one another along their upper edges and having their lower edges spaced when in closed position, conveyor mechanisms for delivering hay from the rake to the interior of the drum, one section of the drum being stationary, the other section being movable, means for swinging the last named section to open position to discharge a bale contained therein, and means for locking said section in the closed position providing a skid over which the bale is discharged when the last named section is swung to the open position to thereby prevent contact of the bale with the rake.

9. In a hay gathering and baling apparatus, a wheel supported platform, a rake pivotally supported thereby, a horizontally disposed bale forming drum supported by the platform, said drum being longitudinally vertically split the sections of the drum being pivoted to one another along their upper edges and having their lower edges spaced when in closed position, conveyor mechanisms for delivering hay from the rake to the interior of the drum, one section of the drum being stationary, the other section being movable, means for swinging the last named section to open position to discharge a bale contained therein, a transversely extending rock shaft having a plurality of arms and means for holding said rock shaft in adjusted position, said arms in one position of the rock shaft operatively engaging the movable section of the drum to hold the same in closed position and in the second position thereof providing a skid over which a bale moving from the drum is passed to prevent contact thereof with the rake.

10. In a hay gathering and baling apparatus, a wheel supported platform, a rake pivotally supported thereby, a horizontally disposed bale forming drum supported by the platform, said drum being longitudinally vertically split, the sections of the drum being pivoted to one another along their upper edges and having their lower edges spaced when in closed position, conveyor mechanisms for delivering hay from the rake to the interior of the drum, one section of the drum being stationary, the other section being movable, means for swinging the last named section to open position to discharge a bale contained therein, a transversely extending rock shaft having a plurality of arms, and means for holding said rock shaft in adjusted position, said arms in one postiion of the rock shaft operatively engaging the movable section of the drum to hold the same in closed position and in the second position thereof providing a skid over which a bale moving from the drum is passed to prevent contact thereof with the rake, said rake and one of said arms having coacting securing elements whereby they may be connected and whereby when the rock shaft is moved to the first position the rake is moved to inoperative position.

11. In a hay gathering and baling apparatus, a wheel supported platform, a rake pivotally supported thereby, a horizontally disposed bale forming drum supported by the platform, said drum being longitudially vertically split, the sections of the drum being pivoted to one another along their upper edges and having their lower edges spaced when in closed position, conveyor mechanisms for delivering hay from the rake to the interior of the drum, one section of the drum being stationary, the other section being movable, means for swinging the last named section to open position to discharge a bale contained therein, a transversely extending rock shaft having a plurality of arms, means for holding said rock shaft in adjusted position, said arms in one position of the rock shaft operatively engaging the movable section of the drum to hold the same in closed position and in the second position thereof providing a skid over which a bale moving from the drum is passed to prevent contact thereof with the rake, said rake and one of said arms having coacting securing elements whereby they may be connected and whereby when the rock shaft is moved to the first position the rake is moved to inoperative position, clutches for controlling said conveyor mechanisms and a connection between the rake and said clutches whereby the clutches are moved to inoperative position when the rake is moved to the inoperative position.

12. In a hay gathering and baling apparatus, a wheel supported platform, a rake supported thereby, a horizontally disposed bale forming drum supported by the platform and embodying a section movable to permit discharge of a bale formed therein, and means operating during movement of the machine conveying hay from the rake to the interior of the drum and causing the same to move perimetrically of the drum, comprising packers each in the form of a bar the upper end of which operates in the slot formed in the drum and the lower end of which extends adjacent the forward face of the rake, a fixed transversely extending support, links connecting the upper ends of the bars with said support and crank shafts to which the lower ends of the bars are connected, said bars being provided upon their upper faces with teeth.

In testimony whereof I hereunto affix my signature.

JOHN M. WOLF.